3,515,538
2-ACYLAMINO-4-METHYL-5-HALOTHIAZOLES AS SELECTIVE HERBICIDES
Kisaburo Ueno, Kamakura, Masato Koshi, Fujio Tada, and Akira Hirose, Yokohama, and Yoshio Takazawa, Chigasaki, Japan, assignors to Mitsui Koatsu Chemicals, Incorporated, Tokyo, Japan, a corporation of Japan
No Drawing. Continuation-in-part of application Ser. No. 570,710, Aug. 8, 1966. This application Feb. 10, 1969, Ser. No. 798,117
Claims priority, application Japan, Aug. 11, 1965, 40/48,410
Int. Cl. A01n 9/12
U.S. Cl. 71—90         5 Claims

ABSTRACT OF THE DISCLOSURE

Compounds having the general formula:

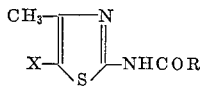

wherein R is an alkyl or alkenyl radical having 1 to 4 carbons and X is Cl or Br are useful to selectively inhibit the growth of broad leaf and grass weeds.

---

This invention relates to compositions and methods for inhibiting plant growth.

This application is a continuation-in-part of co-pending application Ser. No. 570,710, filed Aug. 8, 1966, now abandoned.

According to the present invention, novel herbicidal compositions and methods for inhibiting plant growth are provided by employing as the active herbicide a thiazole derivative of the formula:

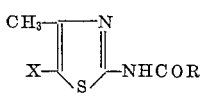

wherein R is an alkyl or alkenyl radical of 1 to 4 carbon atoms and X is chlorine or bromine.

The above-mentioned thiazole derivatives not only effectively inhibit the growth of broad-leaved plants but also selectively inhibit the growth of such grass weeds as crab grasses, barnyard grasses, oats (wild) and foxtails in the presence of such useful grass plants as wheat, rice and barley plants. When the compound is applied to the soil, it shows no germination inhibiting action or other harmful action at all on any of broad-leaved plants and grass plants. However, when it is applied directly to the stems and leaves of such plants, it shows the selective herbicidal action against said broad-leaved plants and grass weeds.

The above-mentioned compounds which are easily prepared by the following method are crystals soluble in alcohol, acetone, benzene and petroleum ether but insoluble in water. The compound of the above-mentioned formula is obtained by chlorinating or brominating 2-amino-4-methyl thiazole obtained by condensing monochloroacetone and thiourea in the presence of an alkali and reacting the resulting 2 - amino-4-methyl-5-chlorothiazole or 2-amino-4-methyl-5-bromothiazole with a fatty acid of 2 to 5 carbon atoms, its acid anhydride or its acid chloride. Such compounds are exemplified to be 2-acetylamino - 4 - methyl-5-chlorothiazole, 2-propionylamino-4-methyl-5-chlorothiazole, 2-butyrylamino - 4 - methyl-5-chlorothiazole, 2 - valerylamino - 4 - methyl-5-chlorothiazole, 2-acetylamino - 4 - methyl - 5 - bromothiazole, and 2-propionylamino - 4 - methyl - 5 - bromothiazole.

The method of the present invention is carried out by applying a growth inhibiting amount of the above-mentioned thiazole derivative to stems and leaves (the aboveground portions) of undesirable plants. The time for applying the above-mentioned thiazole derivative to undesirable plants is preferably the period from the one-leaf developing time to the six-leaf period in monocotyledonous plants and the period after the cotyledon developing time in dicotyledonous plants. The above-mentioned thiazole derivative is applied at a rate of 5 to 200 g., preferably 20 to 50 g. per are.

The excellent herbicidal action of this thiazole derivative requires the application of a small amount of the active ingredient distributed uniformly over a wide area. Of course, this is difficult to carry out by employing a pure material. However, by increasing the bulk of the material, for example, by mixing this thiazole derivative with an inert diluent or carrier, the application to undesirable plants can be achieved more readily.

There are thus also provided by this invention novel herbicidal compositions containing the thiazole derivative intimately dispersed in an inert carrier. Such carrier may be either solids, such as talc, clay, diatomaceous earth, sawdust, calcium carbonate, and the like, or liquids such as isophorone, cyclohexanone, toluene, xylene, methanol, isopropanol, acetone, water, and the like, in which the active agent may be dissolved or dispersed. It is preferable that the amount of active ingredient present in the composition lies in the range of 0.1 to 50% of the weight of the composition. A surface active agent may be added to the composition to achieve a suitable dispersion or emulsion in a liquid such as water to provide aqueous sprays. Examples of suitable surface active agents are alkylbenzene sulfonic acid salts, polyglycol fatty acid esters, polyoxyethyleneglycol fatty acid esters, polyoxyethyleneglycol polyol fatty acid esters, polyoxyethyleneglycol sorbitan alkyl esters, polyoxyethyleneglycol alkyl ethers, naphthalene sulfonic acid salts and sodium salts of ligninsulfonic acid-formaldehyde condensates. It is preferable that the amount of the surface active agent in the composition lies in the range of 0.05 to 15% of the weight of the composition.

The following examples are provided. The parts and percentages given therein are by weight.

EXAMPLE 1

Each of several pots each of 1/10,000 are and of urea resin was charged with 500 g. of air-dried soil passing through 16 mesh sieve. A mixed fertilizer containing 50 mg. each of N, $P_2O_5$ and $K_2O$ was applied to the soil in each pot and mixed in well. The water content in the soil was brought to 60% of the maximum water capacity of the soil. Twenty seeds each of rice plants, millets and Chinese cabbages were sown in each pot and then covered with 30 g. of the soil. The seeds were germinated and grown in a greenhouse. The sowing days of the rice plant and Chinese cabbage seeds were, respectively, three days and eight days after that of the millet seeds. In 18 days after the sowing day of the millet seeds, 10 regularly grown plants in each pot were left uncut but the remaining plants in each pot were cut off. Two ml. each of suspensions in water of 5,000 mg./l. of 2-acetylamino-4-methyl-5-chlorothiazole, 2 - propionyl-amino-4-methyl-5-chlorothiazole, 2-butyrylamino-4-methyl-5-chlorothiazole, 2-valerylamino-4-methyl-5-chlorothiazole, 2-acetylamino-4-methyl-5-bromothiazole, 2-propionylamino-4-methyl-5-bromothiazole, respectively, were uniformly sprayed on the stems and leaves of the plants in separate pots. Sixteen days after the suspensions were sprayed, the plants were taken out and their heights and weights were measured. The results are indicated in Table 1 as indexes based on the untreated control as 100. The data are mean values of two repetitions.

TABLE 1

| Compound | Height of the plant | | | Weight of the plant | | |
|---|---|---|---|---|---|---|
| | Rice plants | Millets | Chinese cabbages | Rice plants | Millets | Chinese cabbage |
| 2-acetylamino-4-methyl-5-chlorothiazole | 97.7 | 14.0 | 0 | 100 | 13.0 | 0 |
| 2-propionylamino-4-methyl-5-chlorothiazole | 100 | 0 | 0 | 100 | 0 | 0 |
| 2-butyrylamino-4-methyl-5-chlorothiazole | 100 | 0 | 0 | 100 | 0 | 0 |
| 2-valerylamino-4-methyl-5-chlorothiazole | 100 | 35.7 | 16.3 | 100 | 9.4 | 5.5 |
| 2-acetylamino-4-methyl-5-bromothiazole | 100 | 47.8 | 14.9 | 100 | 53.4 | 13.7 |
| 2-propionylamino-4-methyl-5-bromothiazole | 100 | 11.2 | 0 | 100 | 34.5 | 0 |
| Untreated control | 100 | 100 | 100 | 100 | 100 | 100 |

EXAMPLE 2

A pot of 1/10,000 are of urea resin was charged with 500 g. of air-dried soil passing through 16 mesh sieve. A compound fertilizer containing 50 mg. of each of N, $P_2O_5$, $K_2O$ was applied to the soil in each pot. The water content in the soil was made 60% of the maximum water capacity. 20 seeds of each kind of millet, potatoes, soybean, tomato, beet, corn, rice plant, wheat, two-rowed barley, rye, barnyard grass, crabgrass, oat, smartweed and lamb's-quarters were sown in each pot then covered with 30 g. of the soil and were germinated and grown in a greenhouse. At the time of three-leaf development of each plant, 5 regularly grown plants were cut off in each pot. 2 ml. of a solution of 0.1, 0.2 or 0.5% 2-acetylamino-5-bromothiazole, 2-propionylamino-5-chlorothiazole, 2-butyrylamino-5-chlorothiazole, 2-butyrylamino-5-bromothiazole, 2-propionylamino-4-methyl-5-chlorothiazole, 2-butyrylamino-4-methyl-5-chlorothiazole, 2-butyrylamino-4-methyl-5-chlorothiazole or 2-acetylamino-4-methyl-5-bromothiazole were uniformly sprayed on the stems and leaves of the plant in each pot.

After four weeks, the degree of damage to the plants is determined, are reported in Table 2 and designated by the values 0–5 which have the following meaning.

0=no effect.
1=slight burns.
2=moderate burns.
3=some leaves and stalk parts partly dead.
4=plan partly destroyed.
5=plant completely dead.

The above test results show that the thiazole derivative used in the present invention has an excellent herbicidal activity and can inhibit weeds such as barnyard grass, crabgrass, smartweed and lambs-quarter growing among crops such as rice plants, wheat, two-rowed barley and rye without giving phytotoxity to the crops. They show also that it can inhibit broad-leaved weeds.

However, the 2-acylamino-4-methyl-5-halothiazole used in the present invention and the 2-acylamino-5-halothiazole used in U.S. Pat. 3,374,082 have respectively different herbicidal characteristics. Whereas the former is nontoxic at all to wheat, two-rowed barley and rye, the latter is so toxic to these crops as not to be able to be used to control the growth of weeds among them. On the other hand, to soybeans and corn, the former is very toxic but the latter is non-toxic. Such differences in their operation characteristics seem to be greatly influenced by the presence or absence of the methyl radical in the 4-position.

EXAMPLE 3

Preparation of dusts (1) 5 parts of 2-acetylamino-4-methyl-5-chlorothiazole and 95 parts of fine powdered talc are mixed thoroughly and then ground to provide a dust.

(2) 1 part of 2-propionylamino-4-methyl-5-chlorothiazole and 99 parts of fine powdered calcium carbonate are mixed thoroughly and then ground to provide a dust.

(3) 10 parts of 2-propionylamino-4-methyl-5-nitrothiazole and 90 parts of diamotaceous earth are mixed thoroughly and then ground to provide a dust.

TABLE 2

| Active Compound | Percent Concentration of Active Compound (%) | Two-rowed barley | Rye | Rice Plant | Wheat | Millet | Potatoes | Soy bean | Tomatoes | Beet | Corn | Barnyard grass | Crabgrass | Oat | Smartweed | Lamb's quarters | |
|---|---|---|---|---|---|---|---|---|---|---|---|---|---|---|---|---|---|
| 2-propionylamino-4-methyl-5-chlorothiazole | 0.1 | 0 | 0 | 0 | 0 | 3 | 5 | 5 | 5 | 5 | 4-5 | 4 | 4 | 1 | 4 | 4 | Invention |
| | 0.2 | 0 | 0 | 1 | 0 | 5 | 5 | 5 | 5 | 5 | 5 | 5 | 5 | 2 | 5 | 5 | |
| | 0.5 | 0 | 0 | 2 | 0 | 5 | 5 | 5 | 5 | 5 | 5 | 5 | 5 | 3 | 5 | 5 | |
| 2-butyrylamino-4-methyl-5-chlorothiazole | 0.1 | 0 | 0 | 0 | 0 | 2 | 3 | 3 | 5 | 4 | 4 | 2 | 2 | 0 | 4 | 3 | |
| | 0.2 | 0 | 0 | 1 | 0 | 3 | 4 | 4 | 5 | 5 | 4 | 3 | 4 | 1 | 4 | 3 | |
| | 0.5 | 0 | 0 | 2 | 1 | 4 | 5 | 5 | 5 | 5 | 5 | 3 | 5 | 2 | 5 | 4 | |
| 2-butyrylamino-4-methyl-5-bromothiazole | 0.1 | 0 | 0 | 0 | 0 | 0 | 2 | 3 | 5 | 2 | 3 | 2 | 2 | 0 | 1 | 2 | |
| | 0.2 | 0 | 0 | 1 | 0 | 3 | 3 | 3 | 5 | 4 | 3 | 3 | 4 | 1 | 3 | 3 | |
| | 0.5 | 0 | 0 | 2 | 0 | 4 | 4 | 5 | 5 | 4 | 5 | 4 | 4 | 3 | 4 | 4 | |
| 2-acetylamino-4-methyl-5-bromothiazole | 0.1 | 0 | 0 | 0 | 0 | 1 | 3 | 3 | 5 | 3 | 3 | 2 | 2 | 0 | 2 | 2 | |
| | 0.2 | 0 | 0 | 1 | 0 | 3 | 4 | 4 | 5 | 4 | 4 | 3 | 3 | 1 | 3 | 3 | |
| | 0.5 | 0 | 0 | 1 | 0 | 4 | 5 | 5 | 5 | 5 | 4 | 4 | 2 | 3 | 4 | | |
| 2-acetylamino-5-bromothiazole | 0.1 | 2 | 1 | 0 | 1 | 1 | 5 | 0 | 3 | 2 | 0 | 0 | 1 | 0 | 2 | 1 | |
| | 0.2 | 3 | 2 | 2 | 2 | 2 | 5 | 1 | 4 | 4 | 0 | 1 | 2 | 1 | 3 | 3 | |
| | 0.5 | 3 | 3 | 3 | 3 | 4 | 5 | 2 | 4 | 4 | 0 | 2 | 3 | 2 | 4 | 4 | |
| 2-propionylamino-5-chlorothiazole | 0.1 | 2 | 2 | 1 | 2 | 5 | 5 | 0 | 5 | 5 | 0 | 4 | 2 | 1 | 4 | 4 | |
| | 0.2 | 3 | 3 | 1 | 4 | 5 | 5 | 0 | 5 | 5 | 0 | 5 | 5 | 2 | 5 | 5 | |
| | 0.5 | 4 | 4 | 2 | 5 | 5 | 5 | 2 | 5 | 5 | 1 | 5 | 5 | 3 | 5 | 5 | |
| 2-butyrylamino-5-chlorothiazole | 0.1 | 0 | 1 | 0 | 3 | 3 | 4 | 0 | 3 | 3 | 0 | 1 | 0 | 0 | 2 | 0 | |
| | 0.2 | 2 | 2 | 0 | 3 | 4 | 4 | 0 | 4 | 4 | 0 | 2 | 2 | 1 | 3 | 2 | |
| | 0.5 | 3 | 2 | 2 | 4 | 4 | 5 | 2 | 4 | 4 | 1 | 3 | 4 | 2 | 4 | 3 | |
| 2-butyrylamino-5-bromothiazole | 0.1 | 1 | 0 | 0 | 1 | 2 | 3 | 0 | 3 | 2 | 0 | 2 | 2 | 1 | 2 | 2 | |
| | 0.2 | 2 | 1 | 1 | 2 | 3 | 3 | 0 | 3 | 3 | 0 | 4 | 4 | 3 | 3 | 4 | |
| | 0.5 | 3 | 2 | 2 | 4 | 4 | 5 | 1 | 4 | 4 | 1 | 4 | 5 | 3 | 4 | 4 | |

These dusts are suitable for application with conventional plant dusting equipment.

EXAMPLE 4

Preparation of wettable powders (1) 50 parts of 2-isobutyrylamino-4-methyl-5-chlorothiazole, 45 parts of bentonite and 5 parts of the sodium salt of a lignin sulfonic acid-formaldehyde condensate are mixed thoroughly and then ground to provide a wettable powder.

(2) 30 parts of 2-prionylamino-4-methyl-5-chlorothiazole, 60 parts of kaolin and 10 parts of sodium dodecylbenzene sulfonate are mixed thoroughly and then ground to provide a wettable powder.

Each of these wettable powders is used as a spray after dispersion in water to give the desired concentration of active compound.

EXAMPLE 5

Preparation of emulsifiable concentrates (1) 20 parts of 2-propionylamino-4-methyl-5-chlorothiazole, 50 parts of isophorone, 20 parts of dimethyl sulfoxide and 10 parts of polyoxyethylene sorbitan monolaurate are completely mixed together to give an emulsifiable concentrate.

(2) 30 parts of 2-propionylamino-4-methyl-5-nitrothiazole, 30 parts of isophorone, 30 parts of xylene and 10 parts of polyethylene glycol monolaurate are mixed together to give an emulsifiable concentrate.

Each of these emulsifiable concentrates when mixed with water in proper amounts provides an aqueous dispersion containing the desired concentration of active compound and which is employed as a spray.

What is claimed is:

1. A method of selectively inhibiting the growth of grass weeds in the presence of useful grass plants, which comprises applying to the above-ground portions of said vegetation a plant growth inhibiting amount of a compound of the formula

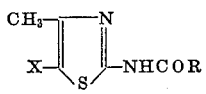

wherein R is an alkyl having one to four carbon atoms, and X is a member selected from the group consisting of chlorine and bromine.

2. A method claimed in claim 1 wherein said compound is applied at a rate of 5 gr. to 200 gr. per are.

3. Method claimed in claim 1 wherein said compound is 2-propionylamino-4-methyl-5-chlorothiazole.

4. Method claimed in claim 1 wherein said compound is 2-butyrylamino-4-methyl-5-chlorothiazole.

5. Method claimed in claim 2 wherein said compound is 2-propionylamino-4-methyl-5-chlorothiazole.

References Cited

UNITED STATES PATENTS

| | | | |
|---|---|---|---|
| 2,735,798 | 2/1956 | Kupferberg et al. | 260—306.8 |
| 3,186,999 | 6/1965 | Slack et al. | 260—306.8 |
| 3,228,888 | 1/1966 | Spivack et al. | 260—306.8 |
| 3,244,723 | 4/1966 | Johnson et al. | 260—306.8 |
| 3,374,082 | 3/1968 | Lemin | 71—90 |
| 3,385,861 | 5/1968 | Meier et al. | 260—306.8 |
| 3,427,318 | 2/1969 | Barber et al. | 260—306.8 |
| 3,429,688 | 2/1969 | Duerr et al. | 71—90 |

FOREIGN PATENTS

| | | |
|---|---|---|
| 4,538 | 10/1966 | France. |
| 1,306,603 | 9/1962 | France. |
| 1,470,974 | 1/1967 | France. |
| 1,488,625 | 6/1967 | France. |

LEWIS GOTTS, Primary Examiner

G. HOLLRAH, Assistant Examiner

U.S. Cl. X.R.

260—306.8